United States Patent
Deng

(10) Patent No.: US 7,382,543 B2
(45) Date of Patent: Jun. 3, 2008

(54) Fθ LENS IN LASER SCANNING UNIT AND METHOD OF MAKING

(75) Inventor: Jau-Jan Deng, Taipei (TW)

(73) Assignee: E-Pin Optical Industry, Co., Ltd., Taipei (TW)

(*) Notice: Subject to any disclaimer, the term of this patent is extended or adjusted under 35 U.S.C. 154(b) by 0 days.

(21) Appl. No.: 11/002,087

(22) Filed: Dec. 3, 2004

(65) Prior Publication Data

US 2005/0286137 A1 Dec. 29, 2005

(30) Foreign Application Priority Data

Jun. 25, 2004 (TW) .............................. 93210073 U

(51) Int. Cl.
G02B 3/00 (2006.01)

(52) U.S. Cl. .................................................... 359/662
(58) Field of Classification Search ................ 359/662; 264/1.32, 2.5, 2.7, 478–480

See application file for complete search history.

(56) References Cited

U.S. PATENT DOCUMENTS 5,748,482 A * 5/1998 Nishimura .................. 700/164
6,330,524 B1 * 12/2001 Suzuki et al. ............... 702/159

* cited by examiner

Primary Examiner—Hung X. Dang
Assistant Examiner—Joseph Martinez
(74) Attorney, Agent, or Firm—Lowe Hauptman Ham & Berner, LLP

(57) ABSTRACT

The present invention mainly relates to the structure and manufacturing process of a new fθ lens in LSU, which is plastic lens produced through injection molding. Its optical surface is made of multi-sections, and the optical surface of each section, according to the angles formed between the sections and the laser beams ripping-in, are designed with a specified coefficient set. Therefore, this new fθ lens, with high tolerance in assembling and high performance in scanning, avoids the demerit of conventional fθ lens, each optical surface of which has only one coefficient set. According to the curve fall formed at the border of every two optical surfaces, we find out a way to ascertain the best continuing surface profile, which is curve fitting simulation and optical simulation. At last, we produce a mold for the fθ lens with multi-sections optical surface by using super-precise machine process to control the mold processing and use the mold for injection molding, and then manufacture lots of fθ lens with multi-sections optical surface.

1 Claim, 8 Drawing Sheets

311
Rx=15.69625
Ry=191.54773
Kx=6.534837
A4=0.338213e-05
A6=-0.884789e-09
A8=0.704742e-12
A10=-0.663565e-16

321
Rx=15.70935
Ry=190.91855
Kx=14.304
A4=0.247252e-05
A6=-0.39189e-12
A8=0.269518e-12
A10=-0.525759e-17

312
Rx=1538.44332
Ry=-120.33220
Kx=-6.5787e+04
Ky=-46.728932
AR=0.548716e-05
BR=0.21225e-11
CR=0.517984e-09
DR=0.374539e-16
AP=-0.567339
BP=0.30017
CP=0.996199
DR=0.677538

322
Rx=1629.45057
Ry=-120.02097
Kx=-5.0196e+04
Ky=-35.921
AR=0.554266e-05
BR=0.236039e-10
CR=0.224628e-08
DR=0.277201e-16
AP=-0.258166
BP=-0.203454+01
CP=-0.855245
DR=0.877538

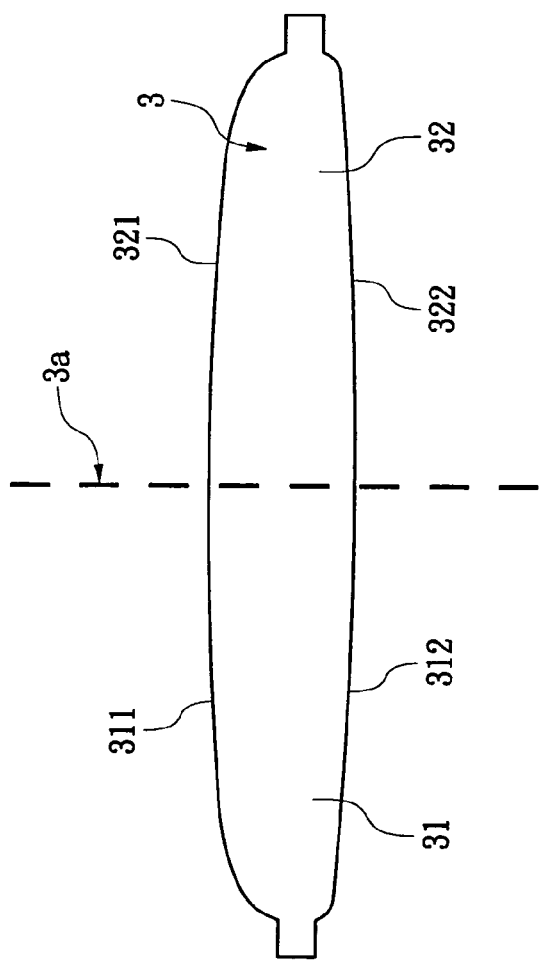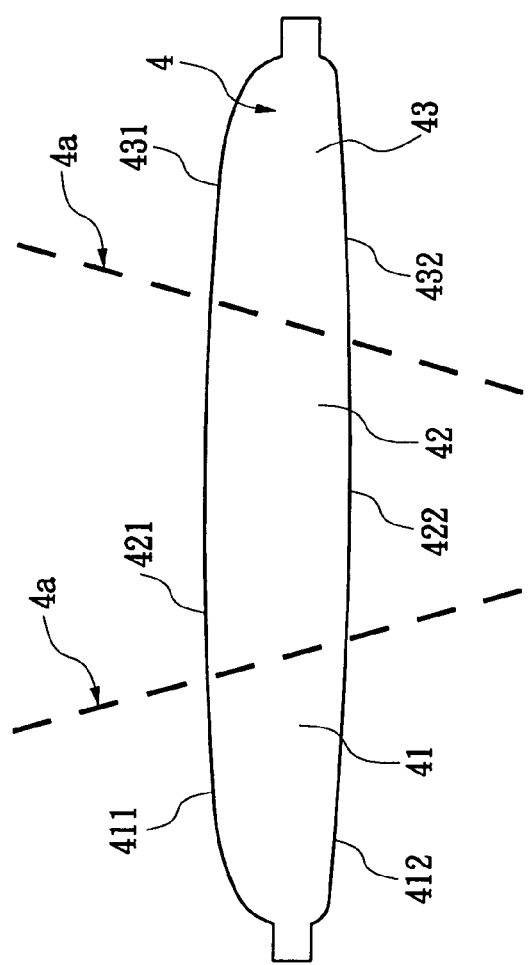

311

Rx=15.69625
Ry=191.54773
Kx=6.534837
A4=0.338213e-05
A6=-0.884789e-09
A8=0.704742e-12
A10=-0.663565e-16

321

Rx=15.70935
Ry=190.91855
Kx=14.304
A4=0.247252e-05
A6=-0.39189e-12
A8=0.269518e-12
A10=-0.525759e-17

312

Rx=1538.44332
Ry=-120.33220
Kx=-6.5787e+04
Ky=-46.728932
AR=0.548716e-05
BR=0.21225e-11
CR=0.517984e-09
DR=0.374539e-16
AP=-0.567339
BP=0.30017
CP=0.996199
DR=0.677538

322

Rx=1629.45057
Ry=-120.02097
Kx=-5.0196e+04
Ky=-35.921
AR=0.554266e-05
BR=0.236039e-10
CR=0.224628e-08
DR=0.277201e-16
AP=-0.258166
BP=-0.203454+01
CP=-0.855245
DR=0.877538

Fθ LENS IN LASER SCANNING UNIT AND METHOD OF MAKING

BACKGROUND OF THE INVENTION

The present invention relates to a fθ lens in a laser scanning unit (LSU) and method of making the same, and more particularly to a fθ lens having multi-sections optical surface, instead of the prior-art which having single section optical surface with single coefficient set, in order to achieve higher tolerance in assembling quality and higher performance in scanning effects.

Commonly used technologies, applied in Laser Beam Printers are known and described in U.S. Pat. No. 5,128,795, U.S. Pat. No. 5,162,938, U.S. Pat. No. 5,329,399, U.S. Pat. No. 5,710,654, U.S Pat. No. 5,757,533, U.S. Pat. No. 5,619,362, U.S. Pat. No. 5,721,631, U.S. Pat. No. 5,553,729, U.S. Pat. No. 5,111,219, U.S. Pat. No. 5,995,131 and Japanese Patents 4-50908, 5-45580 etc. In all these Laser Scanning Units, the most favored way is to use a highly circumvolving (40000/min) polygonal mirror, to control the scanning of the Laser Beam.

A conventional LSU 1 will not be described with reference to FIGS. 1, 1A, and 1B to explain the structure and optic path in general LSU. As can be seen from FIG. 1, the LSU 1 includes a semiconductor laser 10 that serves as a light source to emit laser beams, which sequentially pass through an aperture 11 and a collimator 12. The laser beams pass through the collimator 12 to form parallel beams and then pass through a cylindrical lens 13, a main function of which is to cause a width of the parallel beams in a sub-major scanning direction or Y-axis to focus in a direction parallel to a major scanning direction or X-axis and thereby form a line image, which is a point in FIG. 1B. The LSU 1 also includes a polygonal mirror 14 that is adapted to rotate at high speed, so that a plurality of reflection mirror 15 uniformly and continuously arranged on the polygonal mirror 14 are just located at or in the vicinity of a focal point of the above-mentioned line image. The polygonal mirror 14 serves to control a direction in which the laser beams are projected from. The a plurality of continuous reflection mirrors 15 at high rotating speed are adapted to deflect and reflect laser beams incident on the reflection mirrors 15 in a direction parallel to the major scanning direction or X-axis to an f.theta. lens 16 at uniform angular velocity. The f.theta. lens 16 is located at one side of the polygonal mirror 14 and may be a single-element scanning lens, as shown in FIG. 1, or a two-element scanning lens, as that shown in the figures of U.S. Pat. No. 5,995,131. Laser beams incident on the f.theta. lens 16 via the reflection mirrors 15 on the polygonal mirror 14 are focused to form a circular light spot that is then projected onto a photoreceptor drum 17 to achieve a required scanning linearity. From the above, we know that the f.theta. lens 16 in LSU 1, with its structure illustrated by FIG. 2, the design of its optical surface is composed of the several equations and coefficient sets as follows:

1. Anamorphic Surface $$Z = \frac{(Cx)x^2 + (Cy)y^2}{1 + (1 - (1+Kx)(Cx)^2 x^2 - (1+Ky)(Cy)^2 y^2)^{1/2}} + AR((1-AP)x^2 + (1+AP)y^2)^2 + BR((1-BP)x^2 + (1+BP)y^2)^3 + CR((1-CP)x^2 + (1+CP)y^2)^4 + DR((1-DP)x^2 + (1+DP)y^2)^5$$

2. First Type Toric Surface:

$$Z = F + \frac{G*y^2}{1 + \sqrt{1 - G^2 * y^2}}$$

$$F = \frac{Cx*x^2}{1 + \sqrt{1 - (1+Kx)*Cx^2*x^2}} + A4*x^4 + A6*x^6 + A8*x^8 + A10*x^{10};$$

$$G = \frac{Cy}{1 - Cy*F};$$

3. Second Type Toric Surface:

$$Z = \frac{x^2/R}{1 + \sqrt{1 - (1+K)*(x/R)^2}} +$$
$$B2*x^2 + B4*x^4 + B6*x^6 + B8*x^8 + B10*x^{10}$$
$$r' = r(1 + D2*x^2 + D4*x^4 + D6*x^6 + D8*x^8 + D10*x^{10})$$

From the equations and coefficient sets mentioned above, we can know that the optical surfaces 21 and 22 of the conventional single fθ lens 2 are composed of one coefficient set, that is to say, the first optical surface 21 and the second optical surface 22 of the fθ lens are consisting of one single coefficient set separately. This design can make the two optical surfaces form a continuing surface profile, but there are problems existing as following:

(1). The main function of the fθ lens is to focus the input laser beams to a circular light spot, and then put the light spot onto a photoreceptor drum through scanning linearity. The diameter of the circular light spot on the scanning linearity is preferred to be 30 μm, or at least the spot should be within a circle whose diameter is 100 μm. As to the structure of a conventional LSU, with reference to FIG. 1, the laser beams pass to the reflection mirror 15 of polygon mirror 14, then reflected to fθ lens. Obviously, the central axis of the laser beams doesn't aim at the rotating axis of and the polygon mirror 14. Therefore, while designing fθ lens, we should take into consideration the above-mentioned deviation, which cause the optical surface of the best fθ lens to be with unsymmetrical characteristics.

(2). The difficulty in designing a fθ lens is greatly increased as there is unsymmetrical optical field on the optical surface of fθ lens while it should also acquire scanning linearity at the same time. As we all know, if the optical surface on the general fθ lens is designed with a single coefficient set, some trade-off and equilibrating amendment must take place for the two unsymmetrical optical field of fθ lens. However, all these not only raise problems for designing, but also lower the efficiency of the two unsymmetrical optical fields, because the single coefficient set could not reach the optical surfaces requests of the two unsymmetrical optical fields after trade-off amendment. As shown in FIG. 3, in this optical simulation, the fθ lens 2 is made of one coefficient set, and there are polygon mirror 23 polygon reflection mirror 24, laser beam 25 and the photoreceptor drum 26. We found that the light spot 27, within a certain distance, present different shapes rather than a circular light spot. Besides, the light spot sometimes departs from the center of the 100 μm circle, some of the light spots even reach out of the 100 μm circle. The results show that the optical efficiency is decreased by designing fθ lens with single coefficient set even after Trade-off, at the same time tolerance in assembling quality is also lowered and the difficulty in assembling is increased, too. It is the most pitted in designing the structure of fθ lens.

SUMMARY OF THE INVENTION

A primary object of the present invention is to provide a fθ lens in laser scanning unit (LSU). The optical surface of the fθ lens is composed of multi-sections. The optical surface of each section has its own coefficient set designed according to the different angles formed between the laser beams and the sections, avoiding the demerit of one coefficient set in one optical surface, so it is much easier now in designing fθ lens, while higher tolerance in assembling quality and higher performance in scanning effects are also obtained at the same time.

Another object of the present invention is to provide a manufacturing method of the fθ lens in LSU. The procedure of manufacturing is as follows: firstly, fixing the number of sections in the fθ lens, such as 2-section~n-sections, Secondly, obtaining the best coefficient set according to different sections through optical simulation so as to form its optical surface. Thirdly, defining the best continuing surface profile between two sections through curve fitting simulation and optical simulation if there is fall at the border of the optical surface of the adjacent two different sections. Fourthly, producing a mold for the fθ lens with multi-sections optical surface by using super-precise machining like NC to enact the SAG for machine processing, Then, using this mold for injection molding, so that the fθ lens with multi-sections optical surface can be produced in mass production.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 4 is a top elevation view of a fθ lens with two-section optical surface of the present invention.

FIG. 4A is a top elevation view of a fθ lens with three-section optical surface of the present invention.

DETAILED DESCRIPTION OF THE PREFERRED EMBODIMENT

Figure 1:
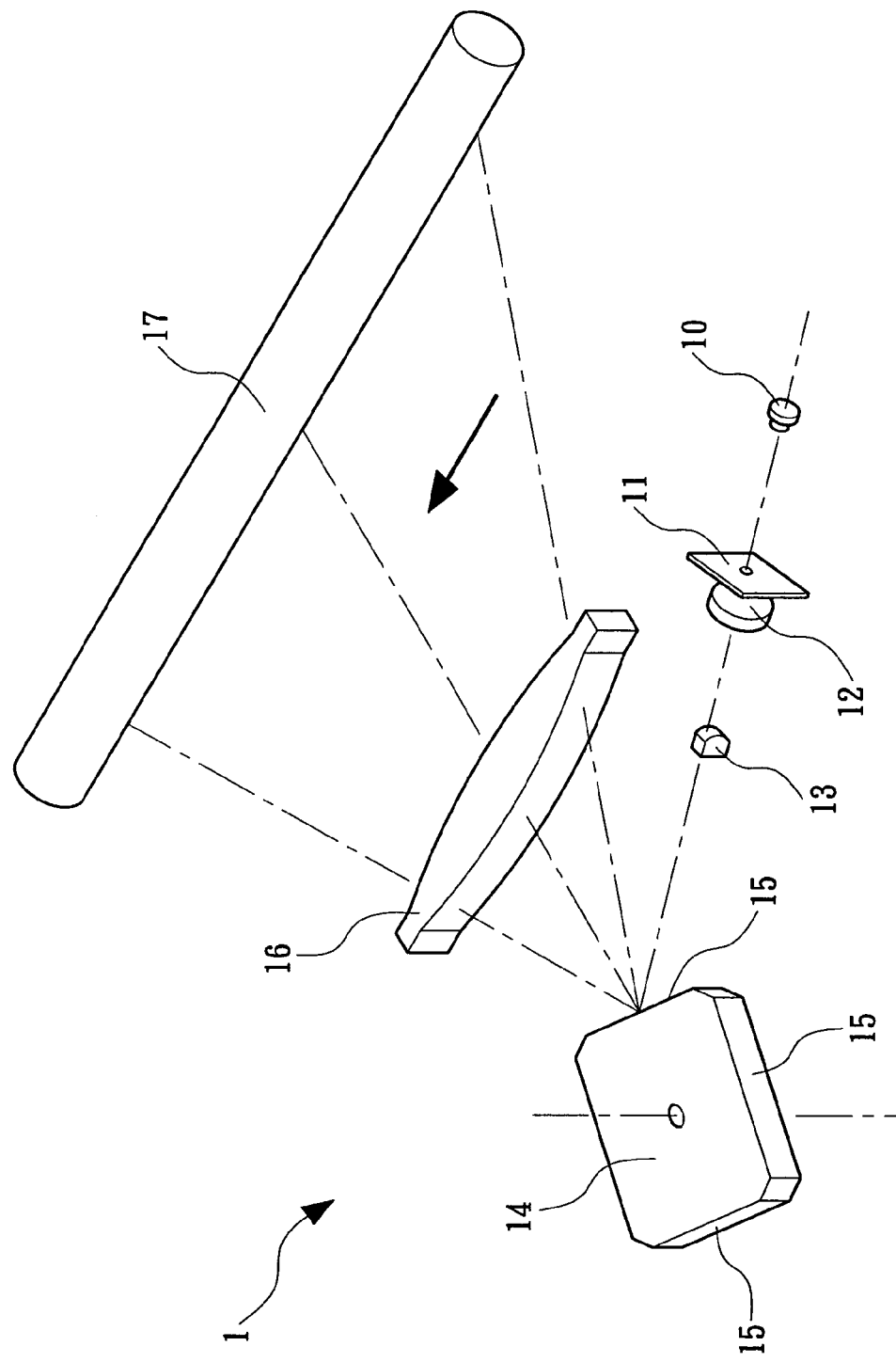
FIG. 1 is a perspective view of a conventional LSU.
Figure 1A:
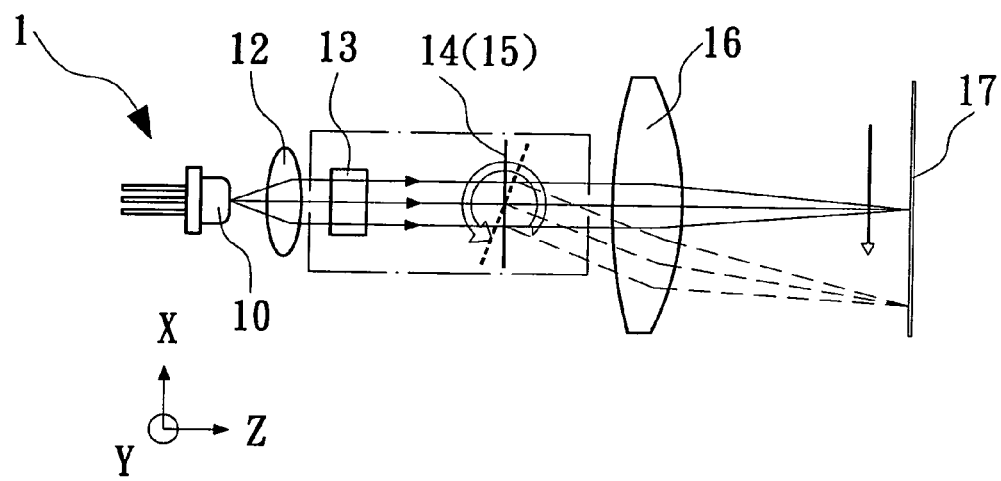
FIG. 1A is a top elevation view of the optical path of a conventional LSU as shown in FIG. 1.
Figure 1B:
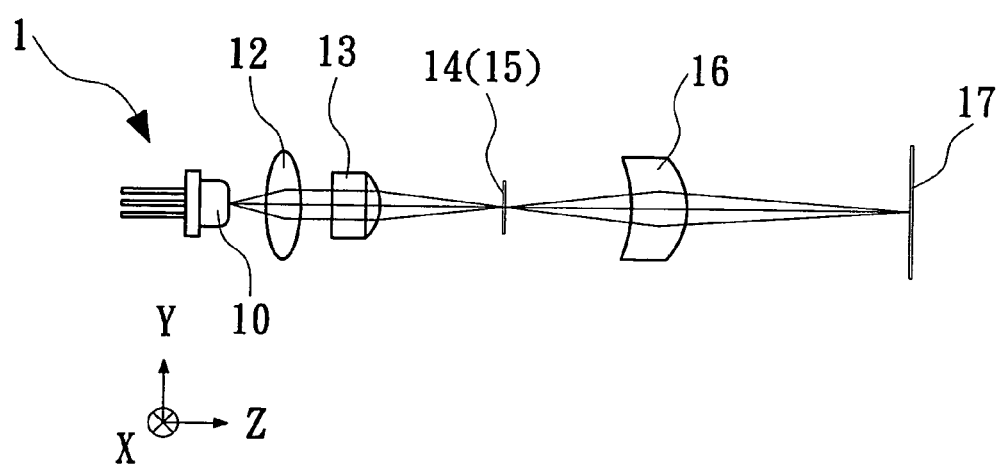
FIG. 1B is a side elevation view of the optical path of a conventional LSU as shown in FIG. 1.
Figure 2:
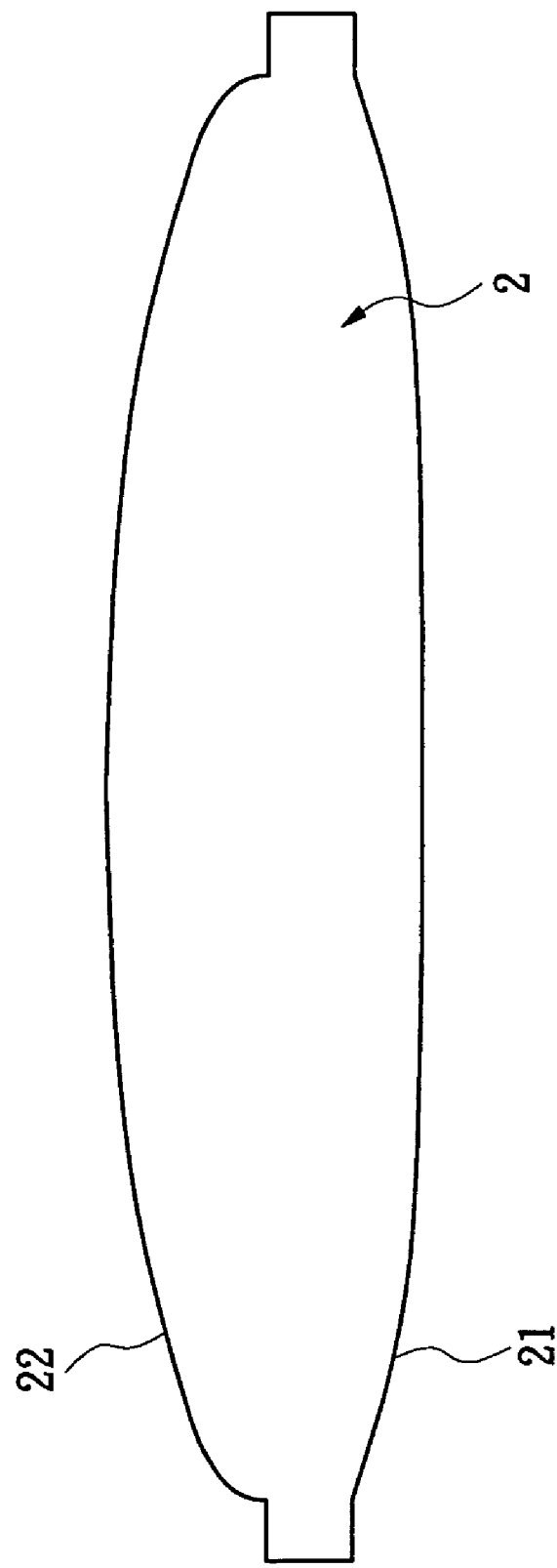
FIG. 2 is a top elevation view of a conventional fθ lens with single coefficient set.
Figure 3:
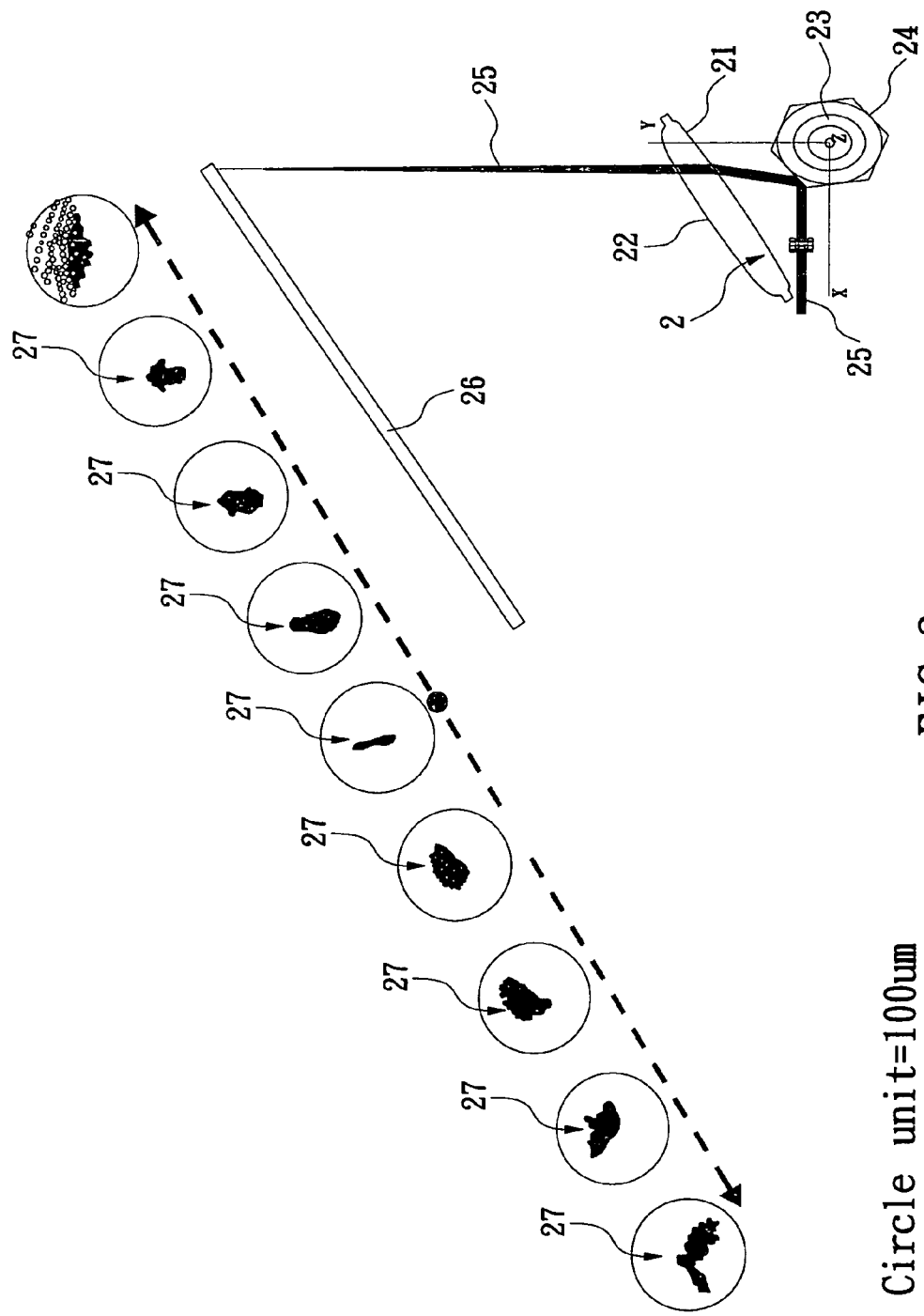
FIG. 3 is a plan of the light spots through optical simulation for a conventional fθ lens with single coefficient set.

The present invention present invention is characterized by a fθ lens in LSU so that the fθ lens is composed of multi-sections. Furthermore, the optical surface of each section is designed with a specific coefficient set according to the different angles formed between the sections and the laser beams passing through. Referring to FIG. 4, fθ lens 3 is divided into two sections by boundary 3a, the first section 31 and the second section 32. In FIG. 4A, fθ lens 4 is divided into 3 sections by two boundaries 4a, the first section 41, the second section 42 and the third section 43. Being deduced by analogy, a fθ lens can be divided into as many sections as needed. Besides, the main optical surface of each section, like four optical surfaces 311, 312, 321 322, in fθ lens 3 or the six optical surfaces 411, 412, 421, 422, 431, 432, in fθ lens 4, is designed with a specific coefficient set according to different angles formed between the sections 31, 32 (or 41, 42, 43) on lens 3 (or 4) with the laser beams passing through. Consequently, this new fθ lens 3 or 4 with multi-sections optical surface can achieve higher tolerance in assembling quality and higher performance in scanning effects.

Figure 5A:
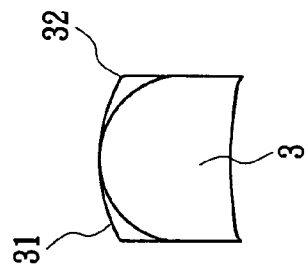
FIG. 5A is a cross-sectional view taken along line 5A-5A shown in FIG. 5.
Figure 5:
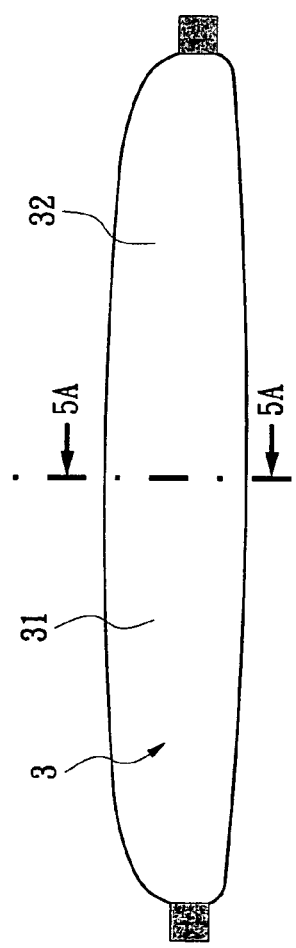
FIG. 5 is a top elevation view of a fθ lens with two-section optical surface of the present invention.
Figure 6:
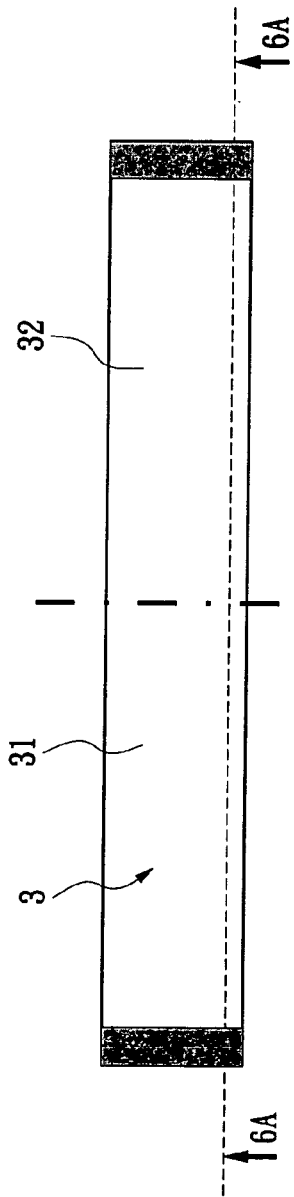
FIG. 6 is a side elevation view of a fθ lens with two-section optical surface shown in FIG. 5.
Figure 6A:
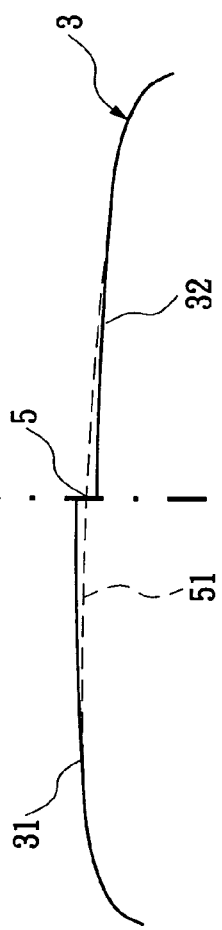
FIG. 6A is a cross-sectional view taken along line 6A-6A shown in FIG. 6.

Referring to FIGS. 5, 5A, 6, 6A and taking the fθ lens 3 with 2-sections optical surface for instance, since the optical surface of the first section 31 and the second section 32 are composed of different coefficient sets, there may be curve fall appearing at the border of the optical surfaces of these two sections, and the biggest curve fall will exists at the edge of the fθ lens, as the fall 5 illustrated in FIG. 5A or 6A. As for fall 5, we can first apply the curve fitting simulation, and then perform optical simulation for the fitted curve to gain a best continuing surface profile 51. Then, we use super-precise machining process like NC to control the SAG, to produce a mold for the fθ lens with multi-sections optical surface and also with a best continuing surface profile at the border of the optical surfaces of the two sections. Then, use this mold for injection molding to produce the fθ lens in mass production.

Figure 7:
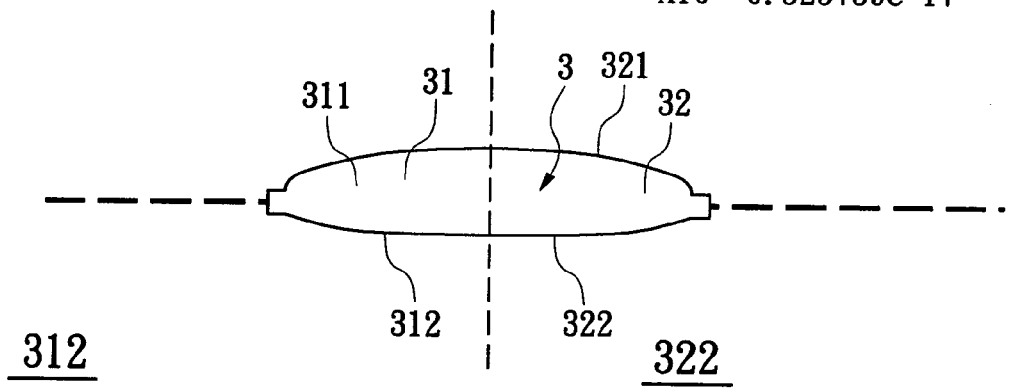
FIG. 7 is a structure of the fθ lens with two-section optical surface according to a preferred embodiment of the present invention.
Figure 8:
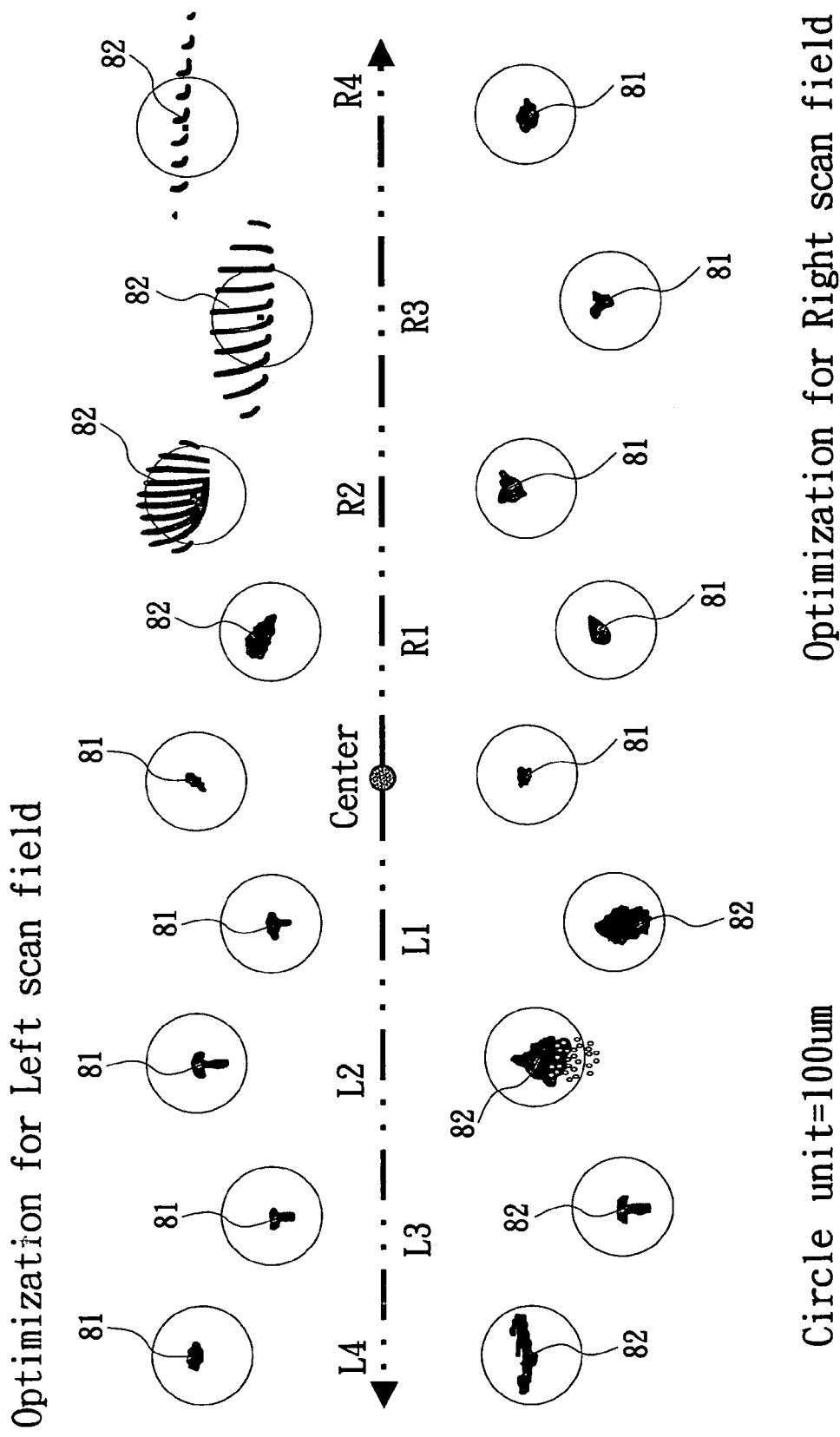
FIG. 8 is a plan of the light spots through optical simulation for the fθ lens with two-section optical surface shown in FIG. 7, including the comparison of light spots through optical simulation for a conventional fθ lens with single coefficient set.

The fθ lens with multi-sections optical surface for this invention, has truly solved the designing demerit of the conventional fθ lens, which has only one coefficient set for each optical surface. Referring to FIGS. 7, 8, it is about a fθ lens 3 with 2-sections optical surfaces, including optical surfaces 311, 312 in the first section and optical surfaces 321, 322 in the second section. Each optical surface and its own coefficient set are illustrated in FIG. 7. As shown in FIG. 8, the imaging light spots 81 on the upper side of the left or the lower side of the right (each five 100 μm circles) are formed by the fθ lens of this invention, while the light spots 82 on the lower side of the left and the upper side of the right (each four 100 μm circles) are formed by the conventional fθ lens. Obviously, the fθ lens of the invention better than the conventional fθ lens.

The manufacturing process of this new fθ lens is as followed:

fixing the number of sections in a fθ lens, such as 2-section~n-sections;

Obtaining the best coefficient set for each section (for example, section 1, section 2, . . . section n) separately through optical simulations and then forming the topical surface for each section.;

defining the best continuing surface profile between two sections through curve fitting simulation and optical simulation if there is fall at the border of the optical surface of these two different sections;

producing a mold for the fθ lens with multi-sections optical surface according to the above defined fθ lens by using super-precise machining like NC to enact the SAG for machine processing;

using the above produced mold for injection molding, so that the fθ lens with multi-sections optical surface can be produced in mass production.

What is claimed is:

1. A method for manufacturing a fθ lens with multi-section optical surfaces and with a continuing surface profile by injection molding comprising the steps of:

defining and fixing a plurality of optical sections having a plurality of optical surfaces and wherein each of the optical surfaces in each section consists of a specific coefficient set and wherein said fθ lens includes between 2 and n optical sections;

obtaining the best specific coefficient set for each separate optical surface of each section through optical simulation and then forming the topical surface for each section to form a curve fall on two borders of two adjacent applied surfaces;

amending a curve fall by using curve fitting simulation and/or optical simulation wherein the curve fitting simulation is by applying two specific coefficient sets of said two borders to define a continuing surface profile on the two borders and the optical simulation is by applying two specific coefficient sets of two borders to define a continuing surface profile on said two borders and then forming the topical surface for each section;

using the specific coefficient sets and said best continuing surface profile to produce a mold for injection molding;

manufacturing the fθ lens with continuing surface profile by using a mold; and wherein the mold for injection molding is produced by super-precise NC machining to enact the SAG for machine processing, and wherein the SAG is controlled by all data of the optical surface and the continuing surface profile.

* * * * *